Patented Feb. 7, 1950

2,496,868

UNITED STATES PATENT OFFICE 2,496,868

POLYMERS OF 3-VINYLPYRENE

Ralph G. Flowers, Pittsfield, Mass., assignor to to General Electric Company, a corporation of New York No Drawing. Application May 13, 1948, Serial No. 26,940

12 Claims. (Cl. 260—87.3)

This invention relates to polymers and copolymers of vinyl compounds and to methods of preparing same. More particularly, the invention is concerned with new and useful compositions of matter comprising the product of polymerization of a mass comprising 3-vinylpyrene.

In my copending application, Serial No. 26,939, filed concurrently herewith and assigned to the same assignee as the present invention, there are disclosed and claimed 3-vinylpyrene and methods of preparing the same. I have now discovered that this monomeric material may be polymerized or copolymerized with other polymerizable compositions to yield valuable and useful compositions of matter.

As described in the above-mentioned application, 3-vinylpyrene may be prepared by first acetylating pyrene with an acetylating agent, for example, acetic acid or anhydride, acetyl chloride or bromide, ketene, etc., to obtain 3-acetylpyrene. It is, of course, understood that by further acetylization of the monoacetyl pyrene, it is possible to prepare polymerizable divinyl pyrenes from diacetyl pyrenes by employing the same method as that used for preparing the monovinylpyrene from monoacetyl pyrene. The acetylated pyrene is then reduced or hydrogenated to form a hydroxyethyl pyrene which may then be dehydrated by contacting it with a dehydration catalyst to obtain the monovinylpyrene, more specifically, 3-vinylpyrene, which has a melting point of 87° to 89° C.

Various methods of polymerizing the monomeric 3-vinylpyrene, either by itself or with other copolymerizable materials, may be employed, the more desirable method depending largely upon the properties desired in the final composition. For example, the monomer, either by itself or with other copolymerizable materials, may be dissolved in a suitable inert solvent, for example, an aromatic hydrocarbon solvent (such as benzene, toluene, xylene, etc.) which is also a solvent for any other members of the mixture.

A small amount of solvent has little retarding effect upon, and in some cases actually accelerates, the polymerization of monomer or monomers. A moderately large amount of solvent tends to yield polymers and copolymers of short chain lengths and often results in a period of induction so that even when very active catalysts, such as boron trifluoride, are used, a period of time elapses between the addition of the catalyst and the beginning of the polymerization. This tendency is particularly marked when the polymerization is carried out at elevated temperatures. A very large amount of solvent often inhibits or retards the polymerization of the monomer or comonomers to the extent that polymerization is not effected in a reasonable time.

Another method which has been found effective in preparing the homopolymers and copolymers of the instant claimed invention includes the preparation of an intimate mixture of the monomeric materials by preparing a suspension or emulsion of the monomer or mixture of monomers in a liquid medium as, for example, water.

With specific regard to the polymerization of the monomer, 3-vinylpyrene, itself, it may be said that the readiness and speed of the polymerization depend upon the purity of the latter. The purer the monomer, the greater is the ease and rate of polymerization and the higher the molecular weight of the polymer. The physical properties of the homopolymer are, to a large extent, dependent upon the polymerization. For example, polymerizations carried out at high temperatures at a very rapid rate usually result in polymers of low molecular weight. In order to obtain suitable polymerization products, careful control of the polymerization reaction is necessary.

In producing the claimed homopolymer or copolymers, the polymerization of the monomer or monomeric materials may be carried out by means of heat alone, or it may be accelerated by means of vinyl polymerization catalysts usually employed for the purpose. Examples of such polymerization catalysts are oxygen, ozone, ozonides, hydrogen peroxide, organic and inorganic acids and acidic substances, e. g., hydrochloric acid, hydrofluoric acid, sulfuric acid, boron fluoride, stannic chloride, antimony pentachloride, the halogens, etc.; organic and inorganic peroxides, for instance, peroxides of the aromatic acid series, e. g., benzoyl peroxide, tertiary butyl hydroperoxide, tertiary butyl perbenzoate, 1-hydroxy cyclohexyl hydroperoxide, etc.; peroxides of the aliphatic acid series, for example, acetyl peroxide, stearyl peroxide, lauryl peroxide, etc.; sodium peroxide, barium peroxide, etc.; various per-compounds such as the persulfates, perchlorates, perborates, etc. Heat, light (ultra-violet light) or heat and light may be used with or without a polymerization catalyst in accelerating the polymerization.

Where a catalyst is employed for accelerating the polymerization, the catalyst concentration may be varied, for example, within the range of from 0.05 to 3 or 4 per cent or more, by weight, of the polymerization mixture including the solvent or suspension or emulsion medium if such are employed. Where no such media are employed and the monomers or polymers are employed alone, I have found it advantageous to use from 0.1 to 2 per cent of the catalyst based on the weight of the total weight of the monomer or monomers used.

The most effective temperatures at which the polymerization may be effected lie within the range of from about 45° C. to 200° C., preferably from 60° C. to 150° C., depending upon the presence or absence of solvents, the type of polymerizable materials employed, and the properties desired in the finally polymerized product. Greater polymerization speeds are obtainable at higher temperatures but this usually results in an undesirable reduction in the molecular weight of the finally polymerized product. It is usually advantageous to displace the air in the polymerizable systems and in the free space above the same with an inert atmosphere, for example, nitrogen or carbon dioxide.

The homopolymers of this invention possess, in general, the physical properties of polystyrene except that the softening point of the homopolymer is considerably higher than the softening point of polystyrene. The electrical properties of the homopolymer likewise compare to those of polystyrene, making it valuable for use in electrical insulation. The homopolymers can, in general, be treated in the same manner as any other thermoplastic material. They may be cast, pressed, extruded, rolled, machined and injection- or pressure-molded.

The homopolymer is, in general, compatible with the same materials as polystyrene. For example, it may be plasticized by the same plasticizers where softening point and strength are of secondary importance. Materials simulating synthetic elastic products may be prepared from these homopolymers by adding relatively large amounts of plasticizers.

The monomeric 3-vinylpyrene may be copolymerized with a great number of copolymerizable $CH_2=C<$-containing compounds. Examples of such compositions of matter are dienes, e. g., butadiene, isoprene, piperylene, etc.; a vinyl-substituted aromatic hydrocarbon, e. g., styrene, methyl styrene, divinyl benzene, vinyl fluorenes, acenaphthylene, etc.; acrylic acid and its derivatives, e. g., methacrylic acid, acrylonitrile, acrylamide, methacrylonitrile, methacrylamide, esters of acrylic and methacrylic acids, for example, methyl acrylate, ethyl acrylate, methyl methacrylate, etc.; an ethylenically unsaturated halogenated or unhalogenated aliphatic hydrocarbon, e. g., ethylene, chloroethylenes, fluoroethylenes, chlorofluoroethylenes, etc., and the like.

The copolymerization products of the present invention may be varied in accordance with the nature of the copolymerizable ingredient or ingredients which are copolymerized with the 3-vinylpyrene. The proportions of the copolymerizable monomers may be varied within broad limits. Although the proportions, by weight, ordinarily will be within the range of from 10 to 90 per cent of the 3-vinylpyrene to 90 to 10 per cent of other monomer or monomers, I do not intend to be limited to such range since other proportions of the 3-vinylpyrene and the other copolymerizable ingredient or ingredients may be higher or lower, for instance, from 1 to 99 per cent, by weight, of the 3-vinylpyrene, to from 99 to 1 per cent, by weight, of the other monomeric material or materials. I may preferably employ a copolymerizable mixture containing, by weight, from 1 to 75 per cent of the 3-vinylpyrene, based on the total weight of the copolymerizable ingredients.

3-vinylpyrene can be cross-linked by compounds such as divinyl and diallyl compounds, e. g., divinyl and diallyl esters of diethylene glycol, to form products that have increased heat resistance and can be readily machined and worked. Such products tend toward insolubility and infusibility as the per cent of the divinyl or diallyl compound is increased. The copolymers of 3-vinylpyrene with other vinyl compounds containing only one $CH_2=C<$ grouping, many examples of which have been given previously, are thermoplastic and can be treated, in general, as any thermoplastic material since they can be injection- or compression-molded, cast into films, oriented and fused.

In order that those skilled in the art may better understand how the present invention may be practiced, the following examples are given by way of illustration and not by way of limitation. All parts are by weight.

*Example 1*

Ten parts 3-vinylpyrene was dissolved in 50 parts benzene and 1.0 part benzoyl peroxide added. The solution was heated in an oil bath at 100 C. for five hours. The resulting polymer of 3-vinylpyrene, which was precipitated from the benzene solution by diluting the latter with methanol, had a softening point of 185° C.

*Example 2*

A solution of 10 parts 3-vinylpyrene and 50 parts benzene was mixed with 1.0 part tertiary butyl hydroperoxide and heated in an oil bath at 100° C. for five hours. At the end of this time a white polymer was obtained as a precipitate from the benzene solution by the addition thereto of methyl alcohol.

*Example 3*

In this example a homopolymer of 3-vinylpyrene was obtained using the same ingredients and procedure as employed in Example 2 with the exception that 1.0 part tertiary butyl perbenzoate was employed in place of the tertiary butyl hydroperoxide.

*Example 4*

Ten parts of 3-vinylpyrene was dissolved in 150 parts benzene, and 2.0 parts boron trifluoride etherate was added. Polymerization of the 3-vinylpyrene was completed within 5 minutes with with the evolution of heat. The polymer was precipitated as a white thermoplastic powder from the benzene solution by the addition of methyl alcohol. A disc molded from the above-prepared powdered polymer of 3-vinylpyrene at 160 C. at 40,000 p. s. i., when tested for electrical properties, showed it to have a dielectric constant of 3.2 and a power factor of 0.07 per cent at one megacycle.

*Example 5*

In this example monomeric 3-vinylpyrene was heated in a vessel exposed to the air for 24 hours in a 125° C. oven to yield a hard, brittle resin at room temperature but which was pliable at temperatures above 200° C.

*Example 6*

| | Parts |
|---|---|
| 3-vinylpyrene | 10 |
| Vinyl acetate | 10 |
| Benzoyl peroxide | 1.0 |
| Benzene | 50 |

The above ingredients were heated in an oil bath at 100° C. for 21 hours. At the end of this time the resulting copolymer, which was precipitated from the benzene solution by dilution of the latter with methanol, was found to have a softening point of around 180° C.

*Example 7*

| | Parts |
|---|---|
| 3-vinylpyrene | 10 |
| Acenaphthylene | 10 |
| Benzoyl peroxide | 1.0 |
| Benzene | 50 |

The foregoing ingredients were heated for 21 hours in an oil bath at a temperature of about 100° C. to yield a benzene solution of a copolymer of the two copolymerizable ingredients. Addition of methyl alcohol to the benzene solution resulted in the precipitation of a slightly yellowish thermoplastic powder which did not soften even at 220° C. softening point.

*Example 8*

| | Parts |
|---|---|
| 3-vinylpyrene | 10 |
| Styrene | 10 |
| Benzoyl peroxide | 1.0 |
| Benzene | 50 |

The above ingredients were heated in the same manner as in Example 7 to yield a benzene solution of a copolymer which was precipitated as a white powder upon dilution of the benzene solution with methanol. This copolymer had a softening point of around 155° C.

*Example 9*

| | Parts |
|---|---|
| 3-vinylpyrene | 10 |
| N-vinylphthalimide | 10 |
| Benzoyl phthalimide | 1.0 |
| Benzene | 50 |

The benzene solution of the above materials was heated for 20 hours in an oil bath at a temperature of 100° C. Dilution of the heated solution with methanol precipitated a white thermoplastic powder, which softened at around 175° C.

*Example 10*

| | Parts |
|---|---|
| 3-vinylpyrene | 10 |
| Acrylonitrile | 10 |
| Benzoyl peroxide | 1.0 |
| Benzene | 50 |

The above ingredients were mixed and heated in an oil bath at 100° C. for 20 hours. At the end of this time an 80 per cent yield of the copolymer was obtained by diluting the benzene solution with methanol. This copolymer softened at approximately 210° C.

*Example 11*

| | Parts |
|---|---|
| 3-vinylpyrene | 10 |
| Maleic anhydride | 10 |
| Benzoyl peroxide | 1.0 |
| Acetone | 40 |

All the above ingredients were mixed together and heated for 20 hours in an oil bath at a temperature of 80° C. Upon dilution of the reaction mixture with methanol, there was precipitated in a 90 per cent yield a white powder which comprised a copolymer of the 3-vinylpyrene and the maleic anhydride.

*Example 12*

In a similar manner, but preferably using an emulsion polymerization process, butadiene-1,3 may be copolymerized with 3-vinylpyrene to yield copolymers having certain desirable properties depending upon the proportions of the ingredients. As the ratio of the butadiene-1,3 to 3-vinylpyrene increases, the resulting copolymers tend to become more tough and rubbery.

The polymers and copolymers of this invention may, in general, be modified to fill the requirements of specific applications for which they may not ordinarily be suitable. For example, plasticizers and fillers may be added to the monomer or mixtures of monomers prior to polymerization thereof or they may be added after the polymerization has been completed.

In general, plasticizers commonly used for polymers and copolymers known to the art may be employed in plasticizing the polymeric materials embraced by this invention. The selection of the proper plasticizers depends largely upon the properties desired in the final product. Useful molding compositions may also be prepared by mixing the homopolymers or copolymers with suitable fillers, such as, for example, alpha cellulose, mica dust, titanium dioxide, talc, zinc oxide, magnesium oxide, asbestos, quartz, wood flour, cellulose, or wool fibers, etc.

Various polymerizable compounds in addition to those heretofore specifically mentioned may be simultaneously polymerized or copolymerized with the 3-vinylpyrene to obtain new and useful synthetic compositions, for instance, any compound containing a polymerizable $CH_2=C<$ grouping in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and α-substituted acrylic acids, vinyl esters and halides, methylene malonic esters, mono- and poly-allyl compounds, e. g., the di-, tri-, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

Benzyl acrylate
Benzyl methacrylate
Methyl alpha-chloroacrylate
Ethyl alpha-bromoacrylate
Propyl alpha-chloroacrylate
Para-chlorostyrene
Allyl acrylate
Allyl methacrylate
Methallyl acrylate
Di- and tri-chlorostyrenes
Chlorinated divinylbenzenes
Vinyl methyl ether
Vinyl ethyl ether
Divinyl ether
Methylene methyl malonate
Methylene ethyl malonate
Vinyl chloride
Vinylidene chloride
Diethylene glycol dimethacrylate (diethylene dimethacrylate)
Glyceryl triacrylate
Ethylene glycol diacrylate (ethylene diacrylate)
Diethylene itaconate
Diethyl maleate
Dimethyl fumarate
Para-chlorobenzyl acrylate
Diallyl fumarate
Diethyl itaconate
Diallyl citraconate
Divinyl biphenyl
Vinyl methyl ketone
Clyclopentadiene
2-chloro-butadiene-1,3 (chloroprene)
2,3-dimethyl-butadiene-1,3
Chlorinated methylstyrenes
Chorinated vinylnaphthalenes
Hexadiene-1,5
Octadiene-1,4
2-cyano-butadiene-1,3
Dimethallyl maleate
Dimethallyl itaconate
Dimethallyl phthalate
Amyl acrylate
Hexyl methacrylate
Triallyl citrate
Triallyl aconitate
Vinyl acetate
Vinyl propionate
Vinyl butyrate The homopolymer or copolymers of this invention have a wide variety of commercial applications. They may be used alone or in combination with other insulating materials, for example, paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the products of polymerization of a polymerizable mass containing 3-vinylpyrene as an essential ingredient.

Paper-insulated capacitors wherein paper impregnated with a composition comprising a polymer or copolymer of 3-vinylpyrene constitutes the dielectric material is a more specific example of the use of a composition of my invention in electrical applications. My new polymers and copolymers may also be employed as cable impregnants, in impregnating electrical coils, as filling compound in potheads and cable joints, and in numerous other electrical applications. The device to be treated may be impregnated or filled with the polymerizable mixture (for example, the monomer, mixture of monomers, mixture of partial polymers or copolymers, or mixture of monomer and partial polymer), and polymerization effected in situ.

What I claim as new and desire to secure by Letters Patent of the United States is:

1. A 3-vinylpyrene polymer.
2. A 3-vinylpyrene homopolymer.
3. An interpolymer of (1) 3-vinylpyrene and (2) a different $CH_2=C<$-containing compound which is copolymerizable with the 3-vinylpyrene, the latter compound being present, by weight, in an amount equal to from 1 to 99 per cent of the total weight of the interpolymer.
4. An interpolymer of (1) 3-vinylpyrene and (2) styrene, the 3-vinylpyrene being present, by weight, in an amount equal to from 1 to 99 per cent of the total weight of the interpolymer.
5. An interpolymer of (1) 3-vinylpyrene and (2) vinyl acetate, the 3-vinylpyrene being present, by weight, in an amount equal to from 1 to 99 per cent of the total weight of the interpolymer.
6. An interpolymer of (1) 3-vinylpyrene and (2) a different $CH_2=C<$-containing compound which is copolymerizable with the 3-vinylpyrene, the latter comprising from 1 to 75 per cent, by weight, of the total weight of interpolymer.
7. An interpolymer of (1) 3-vinylpyrene and (2) styrene, the 3-vinylpyrene comprising from 1 to 75 per cent, by weight, of the total weight of the interpolymer.
8. An interpolymer of (1) 3-vinylpyrene and (2) vinyl acetate, the 3-vinylpyrene comprising from 1 to 75 per cent, by weight, of the total weight of the interpolymer.
9. The process for preparing a 3-vinylpyrene polymer which comprises heating a polymerizable mass comprising 3-vinylpyrene in the presence of a polymerization catalyst for the 3-vinylpyrene.
10. The process for preparing a homopolymer of 3-vinylpyrene which comprises heating 3-vinylpyrene in the presence of a polymerization catalyst for the 3-vinylpyrene at a temperature of from 45° to 200° C.
11. The process for preparing an interpolymer of 3-vinylpyrene and a different $CH_2=C<$-containing compound which is copolymerizable with the 3-vinylpyrene, which process comprises heating a mixture comprising the foregoing two monomeric materials wherein the 3-vinylpyrene is present, by weight, in an amount equal to from 1 to 99 per cent of the total weight of the aforementioned copolymerizable mixture and in the presence of a polymerization catalyst for the mixture of copolymerizable materials.
12. The process as in claim 11 wherein the polymerization catalyst is benzoyl peroxide.

RALPH G. FLOWERS.

REFERENCES CITED

The following references are of record in the file of this patent:

UNITED STATES PATENTS

| Number | Name | Date |
|---|---|---|
| 2,341,186 | Matheson et al. | Feb. 8, 1944 |
| 2,371,499 | Britton et al. | Mar. 13, 1945 |
| 2,427,337 | Abbott et al. | Sept. 16, 1947 |